Patented Aug. 4, 1942

2,291,632

UNITED STATES PATENT OFFICE 2,291,632

CHEESE AND THE PRODUCTION THEREOF

Holger Jørgensen, Copenhagen, Denmark, assignor to Aktieselskabet Dansk Gærings-Industri, Copenhagen, Denmark No Drawing. Application June 10, 1940, Serial No. 339,828. In Germany June 28, 1939

9 Claims. (Cl. 99—116)

This invention relates to the production of cheese, and one object of the invention is to procure a method or improvement in the known methods or processes for the production of cheese or a treatment of the cheese causing a reduction in the tendency of the cheese to blow. The invention also relates to cheese, the composition of which is such as to reduce the risk of blowing during the ripening (curing) or storage thereof. Furthermore an object of the invention is also the production of molten cheese, so-called, from ordinary cheese in such a manner that the tendency of the processed cheese to blow during the storage of the same is less than the tendency of molten cheese that has not been produced in the said manner to show this phenomenon of blowing.

In the production of cheese one of the mischiefs most feared is that blowing shall occur in the cheese during the ripening (curing) or storage thereof. The term "blowing" in this connection means an excessive development of gases consisting wholly or partly of hydrogen within the solid or semi-solid mass of cheese. Such blowing is frequently met with in the case of the so-called Emmenthalcheese. Blowing is due to the propagation of anaerobic gas-producing bacteria in the mass of cheese and it will in some cases occur with such violence that cheese that is originally flat and has the shape of a milling stone may become nearly spherical. In the so-called processed cheese blowing may also occur, and, when the cheese is packed in cartons, this phenomenon may even cause the lid thereof to burst.

In order to avoid this phenomenon of blowing it has previously been proposed to add small amounts of chlorates, for example, sodium chlorate, $NaClO_3$, to the milk, from which the cheese is to be produced. The amounts that have been proposed are about 1–4 grams $NaClO_3$ to every 100 liters of milk. The reports on the results of the said addition of chlorates have been rather pessimistic. There are cases, in which blowing has not been prevented in spite of the addition of as much as 50 grams of chlorate to every 100 liters of milk.

I have now found that the tendency of blowing can be decreased by the employment of certain salts, of which it can be proved by measurement that they impart to the liquid phase present a high level of oxidation (redox-potential). Thereby they restrain the vital activity of the micro-organisms which give rise to the phenomenon of blowing and in many cases they cause it to cease completely. From this point of view the employment of chlorates must be deemed a failure in principle owing to the fact that according to measurements that have been made, these chlorates, although disinfectant, are so restrained in their action that a simple addition thereof will not raise the level of oxidation of the liquid phase.

The salts which I have found suitable for use are soluble bromates and iodates, which salts constitute a group of substances being chemically related inorganic salts having a perceivable raising action on the level of oxidation of an aqueous phase. For the reasons stated above the soluble chlorates do not below to the said group of substances.

My invention in its widest aspect thus involves incorporating in cheese, including molten cheese, during the production thereof and at a time previous to the ripening (curing) or storage of the cheese during which blowing tends to occur, a substance selected from the group consisting of the soluble bromates and iodates.

With these general statements of the objects and purposes of my invention I will now proceed to describe certain embodiments thereof and the manner in which my invention is practically carried out, and it will be understood that while I have described what may be considered as preferable embodiments of my invention I do not limit myself to the precise conditions or proportions herein set forth as they may be varied by those skilled in the art in accordance with the particular purposes for which they are intended and the conditions under which they are to be utilised.

Example 1

Fresh whole milk that is either raw or pasteurised at a low temperature and is brought to the fat content desired for the production of the kind of cheese in question by the addition of either skimmed milk or cream and furthermore potassium bromate, sodium bromate, potassium iodate or sodium iodate is added in an amount of 5–50 grams of salt to every 100 kilograms of milk. From the milk cheese is produced in the normal manner.

Example 2

To a rennet solution of such power that 1 ccm. thereof will rennet 100 ccm. of normal cow's milk in 10–20 minutes 5–50 grams of either potassium bromate, sodium bromate, potassium iodate or sodium iodate is added for each liter. During the production of the cheese the rennet solution thus prepared is added to the cheese milk adjusted in advance, the ratio being 1 liter rennet for every 100 liters of milk, after which cheese is produced from the milk in the usual manner. Rennet tablets similar to those of the commerce may also be used provided that a predetermined amount of a soluble bromate or iodate has been added thereto. If rennet from which the use of 25 ccm. for every 100 liters cheese milk is prescribed (which corresponds to the usual power of the rennet of commerce) is to be used a solution of 5-50 grams of one of the said salts in a suitable quantity of water is added to the rennet before use. The latitude of the addition of bromate or iodate is so large that it will be of no importance if variations in the contents thereof are caused by the diary man adding a greater proportion of rennet than that prescribed so as to make the renneting process faster or so as to make a slowly curdling milk rennet within the usual period of time, or by his adding a smaller proportion of rennet than the prescribed one in order to make the renneting process more slow or because the milk curds particularly readily or for other reasons.

Accordingly, in the production of rennet cheese, potassium bromate, sodium bromate, potassium iodate or sodium iodate may be added to the souring or starter, that is, the culture of lactic acid bacteria usually added. The culture will not at all be damaged by the addition of the said substances, and the activity of the culture for the purpose of producing rennet cheese will not be reduced. In the production of cheese curdled by acid alone (soft cheeses) the latter part of the acidification may be somewhat restrained by the addition of the bromate or iodate, and in case of such cheese I prefer to carry out the production in accordance with one of the subsequent Examples 3, 4 or 5.

In the Swiss dairies that is, the dairies in which Emmenthal cheese is produced, the rennet is normally produced in the dairy itself by extracting the calf's stomachs by "schotte" (acidified whey preferably acidified by a pure culture of thermobacterium helveticum). In this case I prefer maintaining in the rennet container a concentration of one of the said salts proportional to the concentration of these salts to be produced in the cheese milk and inversely proportional to the quantity of rennet normally added to each of the curdle vessels. The concentration in the rennet is preferably calculated with these conditions in mind in such a manner that the concentration obtained in the curdling vessel will be in the range of 5-50 grams of the salt in question for every 100 liters of milk.

*Example 3*

After acidification or renneting, cutting and stirring of a charge of cheese milk 25 grams of potassium bromate, sodium bromate, potassium iodate or sodium iodate for every 100 liters of milk under treatment is added to the curdle in the curdling vessel. The salt will readily dissolve in the whey. If, as it is often used, some of the whey is drawn off previous to the last period of stirring and the vessel is filled up with hot water the addition of the said salts is preferably left to be made after the dilution. Thereafter the further stirring and heating is effected and the production of the cheese is carried out in the usual manner. The cheese will contain a proportion of the salt of the same order as the quantity added to the curd in spite of the fact that a part of the salt will of course be removed with the whey in which it will be useful in the same manner as in the cheese by preventing or restraining the vital activity of the bacteria producing the characteristic phenomenon of cheese blowing. From the whey, whey-cheese (Norwegian Myseost) may be produced in the usual manner.

*Example 4*

Cheese milk is prepared, renneted, cut, stirred and heated. The curd is removed from the curdling vessel and is then pressed to form cheese bodies in the usual manner. The cheese bodies are removed from the moulds and placed in a brine containing about 25% sodium chloride and .1-2% potassium bromate, sodium bromate, potassium iodate or sodium iodate. After ½-6 days the cheese bodies are removed from the brine and left to ripen in the usual manner.

*Example 5*

Cheese milk is adjusted, started and renneted, cut and stirred. The cheese mass is removed from the curdling vessel and placed in a container where 5-50 grams potassium bromate, sodium bromate, potassium iodate or sodium iodate is added for every 100 kilograms of the moist curd. The mass is then intimately mixed and kneaded after which it is placed in the moulds, pressed and further treated to form cheese in the usual manner.

*Example 6*

Cheese produced in the usual manner is milled and placed in a melting pan in which it is heated to 60-75° C. for 20-30 minutes under violent stirring. On the melting pan or during the milling the usual proportions of emulsifiers so-called, i. e., a sodium or potassium salt of citric acid or phosphoric acids is added and furthermore 10-50 grams of calcium bromate, sodium bromate, potassium iodate or sodium iodate is added for every 100 kilograms of the cheese. After melting the mass is cooled, moulded, packed and stored in the usual manner.

I have spoken above of the sodium and potassium salts of the bromic and iodic acids, but evidently the cation of these salts is generally without importance so that the corresponding ammonium, calcium or magnesium salts can be used with the same results, these salts being included within the term "alkaline metal bromates and iodates," as used in the claims. The important thing is only that thhe salt must be soluble and that in the concentrations, in which the cation is used, it must have no noxious or poisonous action. Thus, by way of example, bromate of lead is according to statements in the chemical literature sufficiently soluble, but nevertheless of course the greatest caution will be required in view of the poisonousness of the compounds of lead.

The proportions mentioned in the preceding part of the specification are such proportions which have been found very active in experiments in which the raw materials have been artificially contaminated in order to be able to produce conditionally the phenomenon of blowing. It is evident, however, that a somewhat greater proportion in difficult cases will afford a greater security than the smaller proportion and in view thereof it will be natural in cases where blowing is particularly feared, for example in the production of Emmenthal-cheese from the milk of cows foddered by ensilaged fodder, to restrain from using proportions corresponding to the lower limit given in the examples mentioned above. On the other hand, in cases where experience has learned that blowing will not occur frequently smaller proportions than those given may be used, for example, 1 gram of salt for every 100 liters or kilograms of the cheese to be treated. The proportions are not so critical that it will be necessary to take into consideration whether for example a potassium salt or a sodium salt is used although, from a theoretical view point, the latter will of course contain a smaller proportion of the active ion per gram than the former.

Although in the preceding part of the specification the indirect addition is illustrated only by the addition of the salt together with either the rennet or the starter, it is obvious to anyone skilled in the art that the salts in question may well be added in connection with many other additions used during the production of cheese. In many cases additions of dye, solution of nitre or calcium chloride, water or salts are used and nothing will prohibit the addition of the bromate or iodate to the mixture or solution of these or other substances. It must be particularly pointed out that bromates and iodates exert no unfavourable actions upon the useful enzymes, bacterial cultures or cultures of fungi used in the dairies in the production of rennet cheese, so that they may be added together with the same. Of course conditions must not be so as to produce a detrimental effect upon the micro organisms by excessively high concentrations of salts by which there may also be produced precipitation and denaturation of enzymes but this is well known by anyone skilled in the art.

What I claim is:

1. The process of reducing the tendency of cheese to blow during storage, which comprises incorporating in the cheese before the storage thereof a small amount of a salt selected from the group consisting of the soluble bromates and iodates.

2. The process of reducing the tendency of cheese to blow during storage, which comprises adding to the cheese during the production thereof a small amount of a salt selected from the group consisting of the alkaline metal bromates and iodates.

3. The process of reducing the tendency of cheese to blow during storage, which comprises adding to the milk from which the cheese is to be produced a small amount of a salt selected from the group consisting of the soluble bromates and iodates.

4. The process of claim 3 wherein said salt is added to the milk in a quantity not substantially exceeding 50 grams to 100 liters of the milk.

5. The process of reducing the tendency of cheese to blow during storage, which comprises curdling milk, separating the curd from the whey, adding a small amount of a salt, selected from the group consisting of the soluble bromates and iodates, to the curd and then producing cheese from said curd.

6. The process of claim 5 wherein the said salt is added to the curd in proportions ranging from about 1 to 100 grams per 100 kilograms of the curd.

7. The process of reducing the tendency of cheese to blow during storage, which comprises curdling milk, adding a small amount of a salt selected from the group consisting of the soluble bromates and iodates, then separating the curd and producing cheese therefrom.

8. The process of claim 7 wherein the said salt is added in proportions ranging from about 5 to 50 grams per 100 liters of the curdled milk.

9. As a new product, cheese containing a salt, selected from the group consisting of the soluble bromates and iodates, in proportions ranging from about 1 to 100 grams of salt to 100 kilograms of cheese.

HOLGER JØRGENSEN.